(12) United States Patent
Iwakiri et al.

(10) Patent No.: US 8,860,271 B2
(45) Date of Patent: Oct. 14, 2014

(54) ROTATING ELECTRIC MACHINE

(75) Inventors: Mitsuru Iwakiri, Kitakyushu (JP);
Masanobu Kakihara, Kitakyushu (JP);
Kenji Watanabe, Kitakyushu (JP);
Kenichi Aoki, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 91 days.

(21) Appl. No.: 13/451,545

(22) Filed: Apr. 20, 2012

(65) Prior Publication Data

US 2013/0009506 A1    Jan. 10, 2013

(30) Foreign Application Priority Data

Jul. 8, 2011    (JP) .................................. 2011-151636

(51) Int. Cl.
*H02K 21/12* (2006.01)
*H02K 1/27* (2006.01)

(52) U.S. Cl.
CPC .................................... *H02K 1/2773* (2013.01)
USPC ............ 310/156.12; 310/156.08; 310/156.19; 310/156.21

(58) Field of Classification Search
USPC ............. 310/156.11–156.14, 156.35–156.57, 310/216.064, 216.069
See application file for complete search history.

(56) References Cited

U.S. PATENT DOCUMENTS

| | | | |
|---|---|---|---|
| 6,885,122 B2 | 4/2005 | Kaneko et al. | |
| 7,772,735 B2 * | 8/2010 | Nishiura et al. | 310/156.56 |
| 8,004,140 B2 * | 8/2011 | Alexander et al. | 310/156.56 |
| 2006/0017342 A1 * | 1/2006 | Park | 310/156.19 |
| 2009/0096308 A1 * | 4/2009 | Staudenmann | 310/156.08 |
| 2010/0277017 A1 | 11/2010 | Alexander et al. | |
| 2013/0082561 A1 | 4/2013 | Mantovani | |

FOREIGN PATENT DOCUMENTS

| | | |
|---|---|---|
| DE | 10009462 | 8/2001 |
| DE | 102004049072 | 4/2006 |
| DE | 102009001035 | 8/2010 |
| EP | 0803962 | 10/1997 |
| EP | 1223658 | 7/2002 |
| EP | 1557928 | 7/2005 |
| EP | 2254221 | 11/2010 |

(Continued)

OTHER PUBLICATIONS

Extended European Search Report for corresponding EP Application No. 12153468.9-1809, Jun. 28, 2013.

(Continued)

*Primary Examiner* — Tran Nguyen
*Assistant Examiner* — Leda Pham
(74) *Attorney, Agent, or Firm* — Mori & Ward, LLP

(57) ABSTRACT

A rotating electric machine includes a stator and a rotor. The rotor includes an iron core and permanent magnets. The iron core includes a cylindrical connection portion and ten magnetic pole portions. The cylindrical connection portion surrounds a rotation shaft. The ten magnetic pole portions, the number of which corresponding to the number of poles, are disposed radially outside the connection portion. The connection portion and the magnetic pole portions are integrated with each other. The permanent magnets are disposed between the magnetic pole portions. The magnetic pole portions include flange portions that cover parts of radially outer surfaces of the permanent magnets while allowing at least parts of the radially outer surfaces to be exposed. Each of the permanent magnets includes a tapered portion in at least a part thereof, and the tapered portion has a length in a direction perpendicular to the radial direction that decreases radially inward.

4 Claims, 3 Drawing Sheets

(56) References Cited

FOREIGN PATENT DOCUMENTS

| | | |
|---|---|---|
| FR | 2983658 | 6/2013 |
| GB | 2159340 | 11/1985 |
| JP | 54-65309 U | 5/1979 |
| JP | 07-36459 Y | 10/1991 |
| JP | 2003-047185 | 2/2003 |
| JP | 2006-115663 | 4/2006 |
| JP | 2006-166625 | 6/2006 |

OTHER PUBLICATIONS

Japanese Office Action for corresponding JP Application No. 2011-151636, Jan. 8, 2013.

Chinese Office Action for corresponding on Application No. 201210083718.2, May 28, 2014.

* cited by examiner

ROTATING ELECTRIC MACHINE

CROSS REFERENCES TO RELATED APPLICATIONS

The present disclosure contains subject matter related to that disclosed in Japanese Priority Patent Application JP 2011-151636 filed in the Japan Patent Office on Jul. 8, 2011, the entire contents of which are hereby incorporated by reference.

BACKGROUND OF THE INVENTION

1. Field of the Invention

The disclosed embodiment relates to a rotating electric machine.

2. Description of the Related Art

Japanese Examined Utility Model Registration Application Publication No. 7-36459 discloses a permanent-field-magnet rotor including a laminated iron core, rectangular permanent magnets, punched holes formed in the iron core, and nonmagnetic reinforcing members. The laminated iron core includes a connection portion and magnetic pole portions. The connection portion has an annular shape and surrounds a rotation shaft. The magnetic pole portions, each having a sectorial shape, are disposed outside the connection portion, and the number of the magnetic pole portions corresponds to the number of poles. The connection portion and the magnetic pole portions are integrated with each other. The permanent magnets are disposed between the magnetic pole portions. The punched holes are formed so as to extend in the magnetic pole portions and the connection portion, and each of the punched holes has enlarged portions at both ends thereof. The reinforcing members are inserted into the punched holes so as to fill the punched holes therewith.

Rare earth magnets such as neodymium magnets are widely used as permanent magnets included in a rotor of a rotating electric machine. By using a rare earth magnet as a permanent magnet of a rotor, the size of the permanent magnet can be reduced because rare earth magnets have a high magnetic flux density. However, rare earth magnets are expensive. On the other hand, when using an inexpensive magnet such as a ferrite magnet as the permanent magnet, it is necessary to increase the volume of the permanent magnet because ferrite magnets have a magnetic flux density lower than that of rare earth magnets.

In the rotor of the related art described above, the punched holes for reducing leakage flux are formed between the permanent magnets. Therefore, there is a problem in that the length of the permanent magnet in the radial direction and the length of the permanent magnet in a direction perpendicular to the radial direction are limited and therefore it is difficult to increase the volume of the permanent magnet without increasing the diameter of the rotor.

SUMMARY OF THE INVENTION

According to an aspect of the present disclosure, a rotating electric machine includes a stator and a rotor. The rotor includes an iron core and permanent magnets. The iron core includes a cylindrical connection portion that surrounds a rotation shaft and a plurality of magnetic pole portions that are disposed radially outside the connection portion. The number of the magnetic pole portions corresponds to the number of poles. The connection portion and the magnetic pole portions are integrated with each other. The permanent magnets are disposed between the magnetic pole portions. The magnetic pole portions include flange portions that cover at least parts of radially outer surfaces of the permanent magnets while allowing at least parts of the radially outer surfaces to be exposed. Each of the permanent magnets includes a tapered portion in at least a part thereof, and the tapered portion has a length in a direction perpendicular to the radial direction that decreases radially inward.

DESCRIPTION OF THE EMBODIMENTS

Hereinafter, an embodiment will be described with reference to the drawings.

Figure 1:
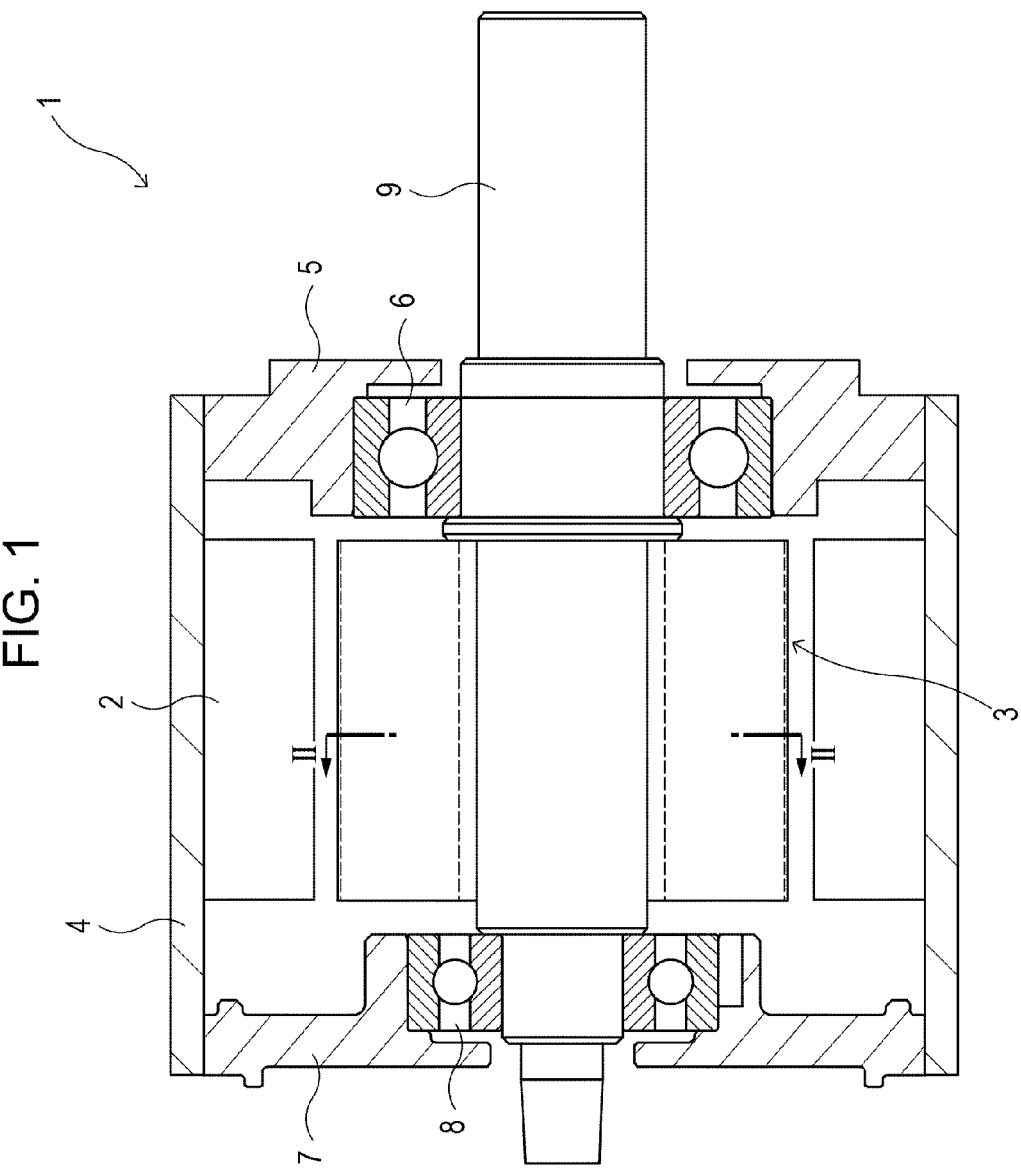
FIG. 1 is a longitudinal sectional view illustrating the overall structure of a rotating electric machine according to an embodiment.

As illustrated in FIG. 1, a rotating electric machine 1 according to the present embodiment is an inner-rotor type electric motor, which includes a stator 2 and a rotor 3 that are disposed so as to face each other in the radial direction and in which the rotor 3 is disposed inside the stator 2. To be specific, the rotating electric machine 1 is an interior permanent magnet (IPM) motor, in which permanent magnets are disposed in the rotor 3. The rotating electric machine 1 includes the stator 2, the rotor 3, a frame 4, a load-side bracket 5, a load-side bearing 6, a counter-load-side bracket 7, a counter-load-side bearing 8, and a shaft 9. The stator 2 is an armature. The rotor 3 is a field magnet. The frame 4 is disposed around the outer periphery of the stator 2. The load-side bracket 5 is disposed at a load-side end (the right end in FIG. 1) of the frame 4. The outer race of the load-side bearing 6 is fitted into the load-side bracket 5. The counter-load-side bracket 7 is disposed at a counter-load-side end (the left end in FIG. 1) of the frame 4. The outer race of the counter-load-side bearing 8 is fitted into the counter-load-side bracket 7. The shaft 9 (rotation shaft) is rotatably supported by the load-side bearing 6 and the counter-load-side bearing 8.

Figure 2:
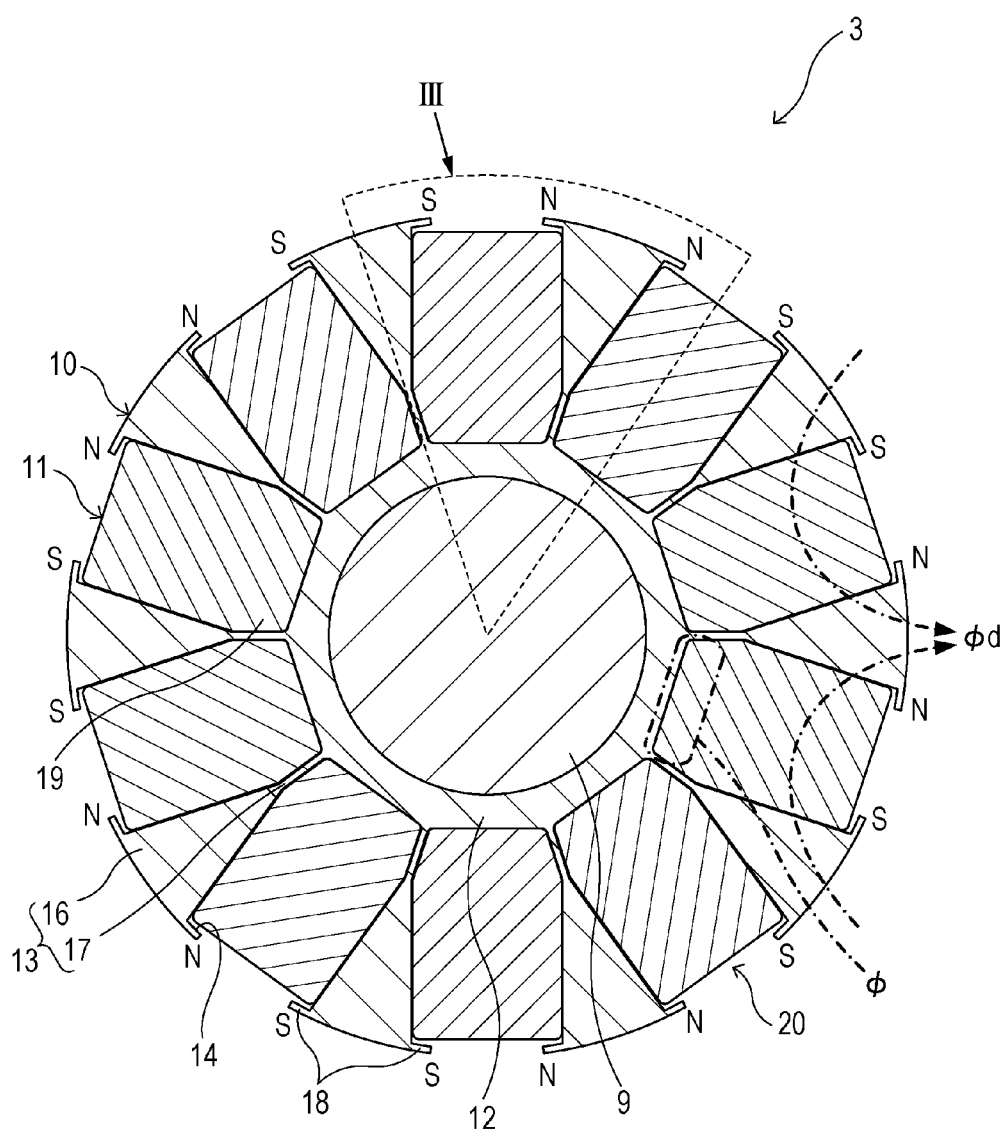
FIG. 2 is a sectional view taken along line II-II of FIG. 1.
Figure 3:
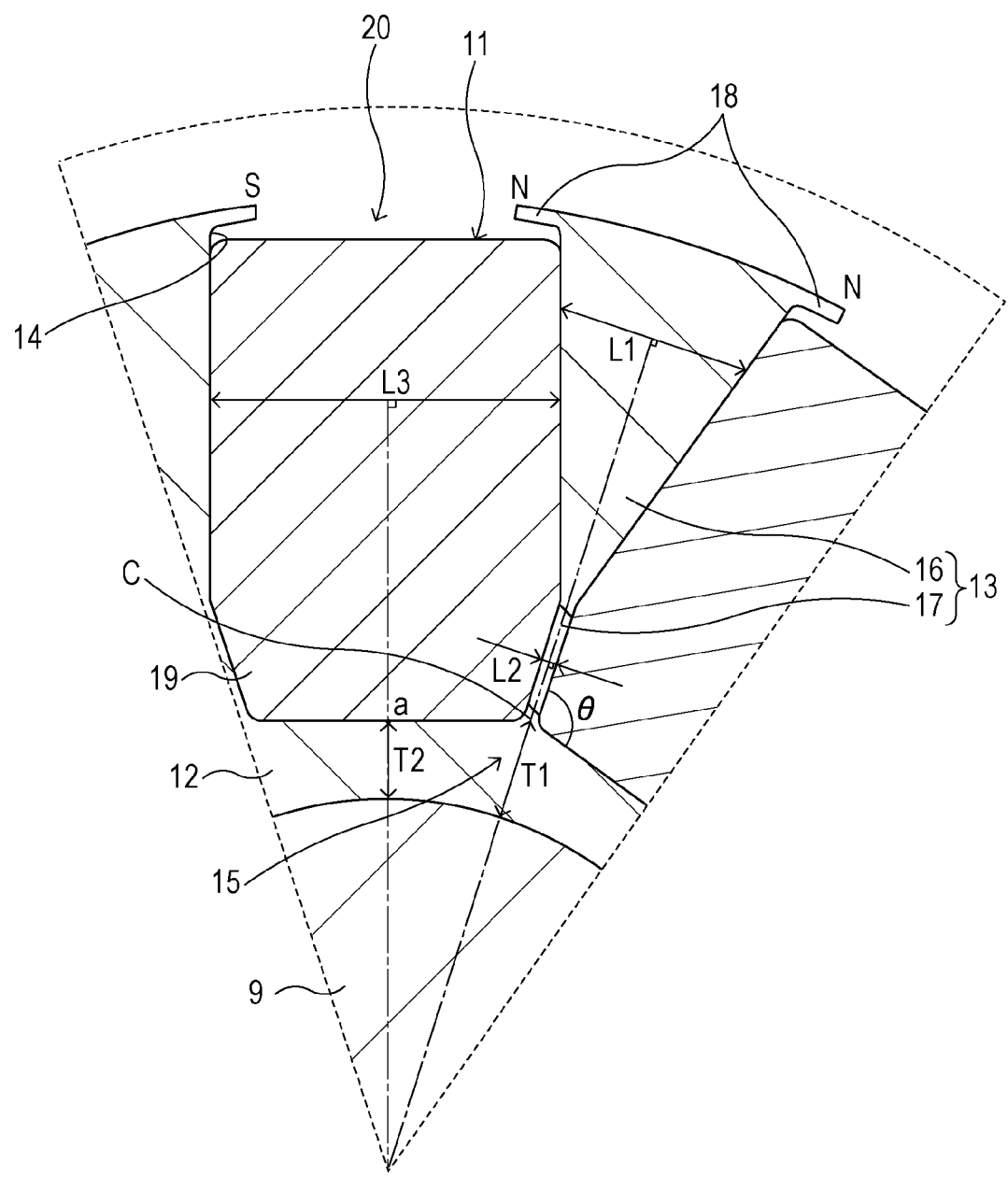
FIG. 3 is an enlarged view of region III of FIG. 2.

The rotor 3 is disposed around the outer periphery of the shaft 9. As illustrated in FIGS. 2 and 3, the rotor 3 includes a laminated iron core 10 (iron core) and a plurality of (in this example, ten) permanent magnets 11.

The laminated iron core 10 includes a cylindrical connection portion 12 and a plurality of (in this example, ten) magnetic pole portions 13. The connection portion 12 surrounds the shaft 9. The magnetic pole portions 13 are disposed radially outside the connection portion 12, and the number of the magnetic pole portions 13 corresponds the number of poles. The connection portion 12 and the magnetic pole portions 13 are integrated with each other. That is, the laminated iron core 10 has a structure in which ten magnetic pole portions 13 protrude radially outward from the cylindrical connection portion 12. Magnet spaces 14 are formed in the laminated iron core 10 at positions that are between the magnetic pole portions 13 and radially outside the connection portion 12 (in other words, between adjacent magnetic pole portions 13) so as to extend through the laminated iron core 10 in the axial direction (in a direction from the front side to the back side of the plane of each of FIGS. 2 and 3). The permanent magnets 11 are disposed in the magnet spaces 14 (as described in detail below).

Parts of the outer peripheral surface (the radially outer surface) of the connection portion 12 between joint portions C (in other words, between adjacent joint portions C), through which the connection portion 12 is joined to the magnetic pole portions 13, are flat surfaces. The connection portion 12 includes thick portions 15 in the vicinity of the joint portions C along the circumferential direction. Each of the thick portions 15 has a radial thickness that is larger than the radial thickness of the connection portion 12 at circumferential positions other than the joint portions C. That is, the radial thickness of the connection portion 12 is not uniform along the entire circumferential direction. The radial thickness of the connection portion 12 in the vicinity of the joint portions C (in other words, the radial thickness of each of the thick portions 15) is larger than the radial thickness of the connection portion 12 at circumferential positions other than the joint portions C. For example, the radial thickness T1 of the connection portion 12 at each joint portion C is larger than the radial thickness T2 at each middle position a between the joint portions C (in other words, between adjacent joint positions C). Here, the middle position a is one of the circumferential positions on the connection portion 12 other than the joint portions C.

Each magnetic pole portion 13 includes a body portion 16, which has a substantially sectorial cross-sectional shape, and a link portion 17, which has a plate-like shape. The body portion 16 has a length L1 in a direction perpendicular to the radial direction that decreases radially inward. The link portion 17 connects the body portion 16 to the connection portion 12 and has a length L2 in a direction perpendicular to the radial direction that is substantially uniform. The body portion 16 includes flange portions 18 on both circumferential sides of a radially outer end of the body portion 16. The flange portions 18 cover parts of the outer surfaces (radially outer surfaces) of the permanent magnets 11 disposed in the magnet spaces 14 while allowing parts of the outer surfaces to be exposed. The link portions 17 are located between tapered portions 19 (described below) of the permanent magnets 11 (in other words, between the tapered portions 19 of adjacent permanent magnets 11) disposed in the magnet spaces 14.

Each permanent magnet 11 is a ferrite magnet including the tapered portion 19 in a radially inner part thereof. The length L3 of the tapered portion 19 in a direction perpendicular to the radial direction decreases radially inward. The inner surface (a surface inside in the radial direction) of each permanent magnet 11 is a flat surface. Each permanent magnet 11 is disposed in the magnet space 14 so as to be aligned radially inward so that the inner surface of the permanent magnet 11 is in close contact with the outer peripheral surface of the connection portion 12 and so that a predetermined gap 20 is formed between the outer surface of the permanent magnet 11 and the flange portions 18.

In the present embodiment, each permanent magnet 11 is inserted into the magnet space 14 in the axial direction and is fixed in the magnet space 14 with an adhesive so as to be aligned radially inward. To facilitate insertion of the permanent magnet 11, the size of the magnet space 14 is made slightly larger than that of the permanent magnet 11. That is, the permanent magnet 11 is disposed in the magnet space 14 in the following way: the permanent magnet 11 is inserted into the magnet space 14 in the axial direction, an exposed part of the outer surface of the permanent magnet 11 is pushed radially inward, and thereby the inner surface of the permanent magnet 11 is abutted against and fixed to the outer peripheral surface of the connection portion 12 with an adhesive.

The rotating electric machine 1 according to the present embodiment uses a magnetic torque that is generated by magnetic flux φd (see FIG. 2) as the torque of the rotor 3. The magnetic flux φd is formed by combining magnetic flux from the laminated iron core 10 and magnetic flux from the permanent magnet 11 in the direct axial direction.

As described above, in the rotating electric machine 1 according to the present embodiment, the rotor 3 includes the laminated iron core 10, in which the connection portion 12 and the ten magnetic pole portions 13 are integrated with one another, and the ten permanent magnets 11 disposed between the magnetic pole portions 13 of the laminated iron core 10.

In general, although it is preferable that the volume of permanent magnets be increased, the length of each permanent magnet in a direction perpendicular to the radial direction is limited due to the presence of magnetic pole portions because the outer peripheral surfaces of the magnetic pole portions of a laminated iron core between the permanent magnets need to have a certain length so that the rotating electric machine can have desired characteristics. For this reason, in the present embodiment, the magnetic pole portions 13 of the laminated iron core 10 include the flange portions 18, which cover parts of the outer surfaces of the permanent magnets 11. Due to the flange portions 18, the outer peripheral surfaces of the magnetic pole portions 13 have a sufficiently large length in the circumferential direction. Therefore, regardless of the limitation described above, the length L3 of each permanent magnet 11 in a direction perpendicular to the radial direction can be increased.

On the other hand, in general, if the length of each permanent magnet in the radial direction and the length of the permanent magnet in a direction perpendicular to the radial direction are larger than predetermined lengths, the ends of the inner surfaces of adjacent permanent magnets in the radial direction come into contact with each other. Therefore, the length of the permanent magnet in the radial direction and the length of the permanent magnet in a direction perpendicular to the radial direction are limited by the distances (pole pitch) between the permanent magnets in the circumferential direction. For this reason, in the present embodiment, each permanent magnet 11 includes the tapered portion 19 disposed in a radially inner part thereof and having the length L3 in a direction perpendicular to the radial direction that decreases radially inward. By disposing the tapered portion 19 in a radially inner part of each permanent magnet 11, ends of adjacent permanent magnets 11 inside in the radial direction are prevented from coming into contact with each other. Therefore, regardless of the limitation described above, the length of each permanent magnet in the radial direction and the length L3 of each permanent magnet 11 in a direction perpendicular to the radial direction can be increased.

Accordingly, with the present embodiment, the volume of the permanent magnets 11 can be increased without increasing the diameter of the rotor 3, i.e. the size of the rotating electric machine 1. As a result, inexpensive ferrite magnets can be used as the permanent magnets 11 instead of rare earth magnets such as a neodymium magnet or a samarium-cobalt magnet while maintaining the performance of the rotating electric machine 1, and thereby the cost of the rotating electric machine 1 can be considerably reduced.

In particular, in the present embodiment, the permanent magnets 11 are disposed in the magnet spaces 14 so that the inner surfaces of the permanent magnets 11 are in close contact with the connection portion 12 and so that the predetermined gaps 20 are formed between the outer surfaces of the permanent magnets 11 and the flange portions 18. That is, the permanent magnets 11 are disposed in the magnet spaces 14 so as to be aligned inward. By disposing the permanent magnets 11 so as to be aligned inward, the permanent magnets 11 can be fixed to the connection portion 12 only by pushing exposed parts of the outer surfaces of the permanent magnets 11 inward, and therefore workability can be improved. Moreover, in this case, the contact areas between the permanent magnets 11 and the laminated iron core 10 can be increased and the permanent magnets 11 can be strongly fixed to the connection portion 12 as compared with the case where the permanent magnets 11 are disposed so as to be aligned outward so that the outer surfaces of the permanent magnets 11 are in close contact with the flange portions 18 and so that predetermined gaps are formed between the inner surfaces of the permanent magnets 11 and the connection portion 12.

In particular, with the present embodiment, the following advantageous effect can be obtained. That is, in the laminated iron core 10, stress tends to be concentrated in the joint portions C between the connection portion 12 and the magnetic pole portions 13 because, as described above, the ten magnetic pole portions 13 protrude radially outward from the cylindrical connection portion 12. In the present embodiment, the connection portion 12 includes the thick portions 15 in the vicinity of the joint portions C between the connection portion 12 and the magnetic pole portions 13, and each of the thick portions 15 have a radial thickness that is larger than the thickness of the connection portion 12 at circumferential positions other than the joint portions C. Thus, the strength of the joint portions C between the connection portion 12 and the magnetic pole portions 13 can be increased, and thereby the laminated iron core 10 has a structure that is stable in terms of strength.

In particular, in the present embodiment, parts of the outer peripheral surface of the connection portion 12 between the joint portions C, through which the connection portion 12 is joined to the magnetic pole portions 13, are flat surfaces. Thus, the vicinity of the joint portions C, through which the connection portion 12 is joined to the magnetic pole portions 13, has a larger thickness. Therefore, the strength of the joint portions C, through which the connection portion 12 is joined to the magnetic pole portions 13 and in which stress tends to be concentrated, can be increased. Moreover, closeness of contact between the permanent magnets 11 and the laminated iron core 10 (flat surface) can be improved, and thereby adhesion between the permanent magnets 11 and the laminated iron core 10 can be increased. Furthermore, the angle θ (see FIG. 3) between the outer peripheral surface of the connection portion 12 and the link portion 17 of each magnetic pole portion 13 can be made larger than that in the case where the outer peripheral surface of the connection portion 12 is curved and the radial thickness of the connection portion 12 is uniform along the entire circumferential direction. Therefore, stress concentration in the joint portions C between the connection portion 12 and the magnetic pole portions 13 can be reduced.

In particular, in the present embodiment, each magnetic pole portion 13 includes the flange portions 18, the body portion 16, and the link portion 17. The flange portions 18 are disposed on both circumferential sides of the radially outer end of the magnetic pole portion 13. The length L1 of the body portion 16 in a direction perpendicular to the radial direction decreases radially inward. The link portion 17 connects the body portion 16 to the connection portion 12 and has a length L2 in a direction perpendicular to the radial direction that is substantially uniform. Because the link portions 17 are disposed between the tapered portions 19 of the permanent magnets 11, the volume of the permanent magnets 11 can be increased while reducing the leakage flux φ (see FIG. 2) by making the length L2 of each link portion 17 in a direction perpendicular to the radial direction as small as possible.

Thus, the magnetic flux φd and the magnetic torque can be increased, and thereby the torque of the rotor 3 can be increased.

The embodiment is not limited to the description above, and can be modified in various ways within the technical scope thereof. For example, in the embodiment described above, the rotating electric machine 1 is of an inner-rotor type in which the rotor 3 is disposed inside the stator 2. However, this is not limited thereto, and the rotating electric machine may be of an outer-rotor type in which a rotor is disposed outside the stator.

In the embodiment described above, the rotating electric machine 1 is an electric motor. However, the rotating electric machine may be an electric generator.

It should be understood by those skilled in the art that various modifications, combinations, sub-combinations and alterations may occur depending on design requirements and other factors insofar as they are within the scope of the appended claims or the equivalents thereof.

What is claimed is:

1. A rotating electric machine comprising:
    a stator; and
    a rotor,
    wherein the rotor includes
        an iron core including a cylindrical connection portion that surrounds a rotation shaft and a plurality of magnetic pole portions that are disposed radially outside the connection portion, the number of the magnetic pole portions corresponding to the number of poles, the connection portion and the magnetic pole portions being integrated with each other, and
        permanent magnets disposed between the magnetic pole portions,
    wherein the magnetic pole portions include body portions respectively provided between adjacent permanent magnets and flange portions that cover at least parts of radially outer surfaces of the permanent magnets while allowing at least parts of the radially outer surfaces to be exposed,
    wherein each of the permanent magnets includes a tapered portion in at least a part thereof, the tapered portion having a length in a direction perpendicular to the radial direction that decreases radially inward,
    wherein a maximum value of a length of the permanent magnet in the direction perpendicular to the radial direction is greater than a maximum value of a length of the body portion of the magnetic pole portion in the direction perpendicular to the radial direction,
    wherein magnet spaces are formed in the iron core at positions between magnetic pole portions and radially outside the connection portion, the magnet spaces extending through the iron core in an axial direction, and
    wherein the permanent magnets are disposed in the magnet spaces in such a way that radially inner surfaces of the permanent magnets are in close contact with the connection portion and predetermined gaps are formed between the flange portions and radially outer surfaces of the permanent magnets such that the radially outer surfaces do not contact the magnetic pole portions that define the magnet spaces.

2. The rotating electric machine according to claim 1,
    wherein the connection portion includes thick portions in a vicinity of joint portions through which the connection portion is joined to the magnetic pole portions along a circumferential direction, each of the thick portions having a radial thickness larger than that of the connection portion at circumferential positions other than the joint portions.

3. The rotating electric machine according to claim 1, wherein parts of a radially outer surface of the connection portion between joint portions through which the connection portion is joined to the magnetic pole portions are flat surfaces.

4. The rotating electric machine according to claim 1, wherein each of the magnetic pole portions includes the body portion having the flange portions on both circumferential sides of a radially outer end of the body portion, the body portion having the length in the direction perpendicular to the radial direction that decreases radially inward, and a link portion having a plate-like shape, the link portion connecting the body portion and the connection portion to each other and having a length in the direction perpendicular to the radial direction that is substantially uniform.

\* \* \* \* \*